United States Patent
Cohn et al.

(10) Patent No.: US 7,640,915 B2
(45) Date of Patent: *Jan. 5, 2010

(54) FUEL MANAGEMENT SYSTEM FOR VARIABLE ETHANOL OCTANE ENHANCEMENT OF GASOLINE ENGINES

(75) Inventors: Daniel R. Cohn, Cambridge, MA (US); Leslie Bromberg, Sharon, MA (US); John B. Heywood, Newton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 160 days.

This patent is subject to a terminal disclaimer.

(21) Appl. No.: 11/871,384

(22) Filed: Oct. 12, 2007

(65) Prior Publication Data

US 2008/0110434 A1 May 15, 2008

Related U.S. Application Data

(63) Continuation of application No. 10/991,774, filed on Nov. 18, 2004, now Pat. No. 7,314,033.

(51) Int. Cl.
*F02D 43/00* (2006.01)
*F02D 41/14* (2006.01)
*F02M 25/14* (2006.01)

(52) U.S. Cl. .................... 123/435; 123/198 A

(58) Field of Classification Search .......... 123/1 A, 123/198 A, 435, 406.29, 406.47, 25 C, 575, 123/525, 27 GE, 295, 304

See application file for complete search history.

(56) References Cited

U.S. PATENT DOCUMENTS

| | | | |
|---|---|---|---|
| 2,741,230 | A | 4/1956 | Reynolds |
| 3,089,470 | A | 5/1963 | Payne |
| 3,106,194 | A | 10/1963 | Cantwell et al. |
| 3,557,763 | A | 1/1971 | Probst |
| 4,031,864 | A | 6/1977 | Crothers |
| 4,056,087 | A | 11/1977 | Boyce |
| 4,182,278 | A | 1/1980 | Coakwell |
| 4,230,072 | A | 10/1980 | Noguchi et al. |
| 4,312,310 | A | 1/1982 | Chivilo' et al. |
| 4,402,296 | A | 9/1983 | Schwarz |

(Continued)

OTHER PUBLICATIONS

A. Modak and L.S. Carletto, "Engine Cooling by Direct Injection of Cooling Water," Society of Automotive Engineers, Inc., 700887.

(Continued)

*Primary Examiner*—Hieu T Vo
(74) *Attorney, Agent, or Firm*—Choate, Hall & Stewart, LLP

(57) ABSTRACT

Fuel management system for efficient operation of a spark ignition gasoline engine. Injectors inject an anti-knock agent such as ethanol directly into a cylinder of the engine. A fuel management microprocessor system controls injection of the anti-knock agent so as to control knock and minimize that amount of the anti-knock agent that is used in a drive cycle. It is preferred that the anti-knock agent is ethanol. The use of ethanol can be further minimized by injection in a non-uniform manner within a cylinder. The ethanol injection suppresses knock so that higher compression ratio and/or engine downsizing from increased turbocharging or supercharging can be used to increase the efficiency of the engine.

25 Claims, 3 Drawing Sheets

U.S. PATENT DOCUMENTS

| | | |
|---|---|---|
| 4,480,616 A | 11/1984 | Takeda |
| 4,541,383 A | 9/1985 | Jessel |
| 4,594,201 A | 6/1986 | Phillips et al. |
| 4,596,277 A | 6/1986 | Djordjevic |
| 4,721,081 A | 1/1988 | Krauja et al. |
| 4,958,598 A | 9/1990 | Fosseen |
| 4,967,714 A | 11/1990 | Inoue |
| 4,974,416 A | 12/1990 | Taylor |
| 4,993,386 A | 2/1991 | Ozasa et al. |
| 5,179,923 A | 1/1993 | Tsurutani et al. |
| 5,233,944 A | 8/1993 | Mochizuki |
| 5,497,744 A | 3/1996 | Nagaosa et al. |
| 5,560,344 A | 10/1996 | Chan |
| 5,715,788 A | 2/1998 | Tarr et al. |
| 5,911,210 A | 6/1999 | Flach |
| 5,937,799 A | 8/1999 | Binion |
| 5,983,855 A | 11/1999 | Benedikt et al. |
| 6,073,607 A | 6/2000 | Liber |
| 6,076,487 A | 6/2000 | Wulff et al. |
| 6,260,525 B1 | 7/2001 | Moyer |
| 6,287,351 B1 | 9/2001 | Wulff et al. |
| 6,298,838 B1 | 10/2001 | Huff et al. |
| 6,321,692 B1 | 11/2001 | Rayner |
| 6,332,448 B1 | 12/2001 | Ilyama et al. |
| 6,340,015 B1 | 1/2002 | Benedikt et al. |
| 6,358,180 B1 | 3/2002 | Kuroda et al. |
| 6,508,233 B1 | 1/2003 | Suhre et al. |
| 6,513,505 B2 | 2/2003 | Watanabe et al. |
| 6,536,405 B1 | 3/2003 | Rieger et al. |
| 6,543,423 B2 | 4/2003 | Dobryden et al. |
| 6,561,157 B2 | 5/2003 | zur Loye et al. |
| 6,575,147 B2 | 6/2003 | Wulff et al. |
| 6,622,663 B2 | 9/2003 | Weissman et al. |
| 6,668,804 B2 | 12/2003 | Dobryden et al. |
| 6,725,827 B2 | 4/2004 | Ueda et al. |
| 6,745,744 B2 | 6/2004 | Suckewer et al. |
| 6,748,918 B2 | 6/2004 | Rieger et al. |
| 6,755,175 B1 | 6/2004 | McKay et al. |
| 6,799,551 B2 | 10/2004 | Nakakita et al. |
| 6,892,691 B1 | 5/2005 | Uhl et al. |
| 6,951,202 B2 | 10/2005 | Oda |
| 6,955,154 B1 | 10/2005 | Douglas |
| 6,990,956 B2 | 1/2006 | Niimi |
| 7,013,847 B2 | 3/2006 | Auer |
| 7,021,277 B2 | 4/2006 | Kuo et al. |
| 7,077,100 B2 | 7/2006 | Vogel et al. |
| 7,086,376 B2 | 8/2006 | McKay |
| 7,107,942 B2 | 9/2006 | Weissman et al. |
| 7,156,070 B2 | 1/2007 | Strom et al. |
| 7,188,607 B2 | 3/2007 | Kobayashi |
| 7,201,136 B2 | 4/2007 | McKay et al. |
| 7,225,787 B2 * | 6/2007 | Bromberg et al. ....... 123/198 A |
| 7,302,933 B2 * | 12/2007 | Kerns .................. 123/431 |
| 7,314,033 B2 * | 1/2008 | Cohn et al. ............ 123/198 A |
| 7,320,302 B2 | 1/2008 | Kobayashi |
| 7,395,786 B2 * | 7/2008 | Leone et al. ............... 123/1 A |
| 7,406,947 B2 * | 8/2008 | Lewis et al. ............... 123/478 |
| 7,444,987 B2 * | 11/2008 | Cohn et al. ............... 123/431 |
| 7,546,835 B1 * | 6/2009 | Hilditch ................. 123/575 |

OTHER PUBLICATIONS

Julian A. LoRusso and Harry A. Cikanek, "Direct Injection Ignition Assisted Alcohol Engine," Society of Automotive Engineers, Inc., 880495, International Contress and Exposition in Detroit, Michigan (Feb. 29-Mar. 5, 1998).

Borje Grandin, et al., "Knock Suppression in a Turbocharged SI Engine by Using Cooled EGR," Society of Automotive Engineers, Inc., 982476, International Fall Fuels and Lubricants Meeting and Exposition in San Francisco, California (Oct. 19-22, 1998).

Borje Grandin and Hans-Erik Angstrom, "Replacing Fuel Enrichment in a Turbo Charged SI Engine: Lean Burn or Cooled EGR," Society of Automotive Engineers, Inc., 1999-01-3505.

C. Stan, et al., "Internal Mixture Formation and Combustion—from Gasoline to Ethanol," Society of Automotive Engineers, Inc., 2001-01-1207.

USPTO Non-Final Office Action, U.S. Appl. No. 10/991,774, Apr. 25, 2006.

USPTO Final Office Action, U.S. Appl. No. 10/991,774, Sep. 27, 2006.

USPTO Non-Final Office Action, U.S. Appl. No. 10/991,774, May 25, 2007.

USPTO Non-Final Office Action, U.S. Appl. No. 11/100,026, Aug. 3, 2006.

Fikret Yuksel and Bedri Yuksel, "The Use of Ethanol-Gasoline Blend as a Fuel in an SI Engine," Renewable Energy, vol. 29 (2004) pp. 1181-1191.

USPTO Non-Final Office Action, U.S. Appl. No. 11/229,755, Mar. 22, 2007.

USPTO Non-Final Office Action, U.S. Appl. No. 11/229,755, Oct. 4, 2007.

USPTO Non-Final Office Action, U.S. Appl. No. 11/682,372, Jan. 2, 2008.

USPTO Final Office Action, U.S. Appl. No. 11/682,372, Oct. 17, 2008.

USPTO Non-Final Office Action, U.S. Appl. No. 11/684,100, Jun. 3, 2008.

PCT International Search Report and Written Opinion, Application No. PCT/IB07/03004, Jul. 9, 2008.

PCT International Search Report and Written Opinion, Application No. PCT/US07/05777, Mar. 24, 2008.

PCT International Search Report and Written Opinion, Application No. PCT/US07/74227, Feb. 25, 2008.

PCT International Search Report and Written Opinion, Application No. PCT/US08/69171, Oct. 3, 2008.

J.B. Heywood, "Internal Combusion Engine Fundamentals," McGraw Hill, 1988, p. 477.

J. Stokes et al., "A gasoline engine concept for improved fuel economy—the lean-boost system," SAE paper 2001-01-2902, pp. 1-12.

H. J. Curran et al., "A comprehensive modeling study of iso-octane oxidation," Combustion and Flame 129:263-280 (2002) pp. 253-280.

B. Lecointe and G. Monnier, "Downsizing a gasoline engine using turbocharging with direct injection" SAE paper 2003-01-0542.

PCT International Search Report and Written Opinion, Appl. No. PCT/US05/041317, Apr. 6, 2006.

PCT International Search Report and Written Opinion, Appl. No. PCT/US06/012750, Jun. 28, 2007.

USPTO Notice of Allowance, U.S. Appl. No. 11/684,100, Mar. 3, 2009.

USPTO Non-Final Office Action, U.S. Appl. No. 11/840,719, Jul. 11, 2008.

* cited by examiner

FUEL MANAGEMENT SYSTEM FOR VARIABLE ETHANOL OCTANE ENHANCEMENT OF GASOLINE ENGINES

This application is a continuation of U.S. patent application Ser. No. 10/991,774 filed Nov. 18, 2004, the contents of which are incorporated herein by reference.

BACKGROUND OF THE INVENTION

This invention relates to spark ignition gasoline engines utilizing an antiknock agent which is a liquid fuel with a higher octane number than gasoline such as ethanol to improve engine efficiency.

It is known that the efficiency of spark ignition (SI) gasoline engines can be increased by high compression ratio operation and particularly by engine downsizing. The engine downsizing is made possible by the use of substantial pressure boosting from either turbocharging or supercharging. Such pressure boosting makes it possible to obtain the same performance in a significantly smaller engine. See, J. Stokes, et al, "A Gasoline Engine Concept For Improved Fuel Economy—The Lean-Boost System," SAE Paper 2001-01-2902. The use of these techniques to increase engine efficiency, however, is limited by the onset of engine knock. Knock is the undesired detonation of fuel and can severely damage an engine. If knock can be prevented, then high compression ratio operation and high pressure boosting can be used to increase engine efficiency by up to twenty-five percent.

Octane number represents the resistance of a fuel to knocking but the use of higher octane gasoline only modestly alleviates the tendency to knock. For example, the difference between regular and premium gasoline is typically six octane numbers. That is significantly less than is needed to realize fully the efficiency benefits of high compression ratio or turbocharged operation. There is thus a need for a practical means for achieving a much higher level of octane enhancement so that engines can be operated much more efficiently.

It is known to replace a portion of gasoline with small amounts of ethanol added at the refinery. Ethanol has a blending octane number (ON) of 110 (versus 95 for premium gasoline) (see J. B. Heywood, "Internal Combustion Engine Fundamentals," McGraw Hill, 1988, p. 477) and is also attractive because it is a renewable energy, biomass-derived fuel, but the small amounts of ethanol that have heretofore been added to gasoline have had a relatively small impact on engine performance. Ethanol is much more expensive than gasoline and the amount of ethanol that is readily available is much smaller than that of gasoline because of the relatively limited amount of biomass that is available for its production. An object of the present invention is to minimize the amount of ethanol or other antiknock agent that is used to achieve a given level of engine efficiency increase. By restricting the use of ethanol to the relatively small fraction of time in an operating cycle when it is needed to prevent knock in a higher load regime and by minimizing its use at these times, the amount of ethanol that is required can be limited to a relatively small fraction of the fuel used by the spark ignition gasoline engine.

SUMMARY OF THE INVENTION

In one aspect, the invention is a fuel management system for efficient operation of a spark ignition gasoline engine including a source of an antiknock agent such as ethanol. An injector directly injects the ethanol into a cylinder of the engine and a fuel management system controls injection of the antiknock agent into the cylinder to control knock with minimum use of the antiknock agent. A preferred antiknock agent is ethanol. Ethanol has a high heat of vaporization so that there is substantial cooling of the air-fuel charge to the cylinder when it is injected directly into the engine. This cooling effect reduces the octane requirement of the engine by a considerable amount in addition to the improvement in knock resistance from the relatively high octane number of ethanol. Methanol, tertiary butyl alcohol, MTBE, ETBE, and TAME may also be used. Wherever ethanol is used herein it is to be understood that other antiknock agents are contemplated.

The fuel management system uses a fuel management control system that may use a microprocessor that operates in an open loop fashion on a predetermined correlation between octane number enhancement and fraction of fuel provided by the antiknock agent. To conserve the ethanol, it is preferred that it be added only during portions of a drive cycle requiring knock resistance and that its use be minimized during these times. Alternatively, the gasoline engine may include a knock sensor that provides a feedback signal to a fuel management microprocessor system to minimize the amount of the ethanol added to prevent knock in a closed loop fashion.

In one embodiment the injectors stratify the ethanol to provide non-uniform deposition within a cylinder. For example, the ethanol may be injected proximate to the cylinder walls and swirl can create a ring of ethanol near the walls.

In another embodiment of this aspect of the invention, the system includes a measure of the amount of the antiknock agent such as ethanol in the source containing the antiknock agent to control turbocharging, supercharging or spark retard when the amount of ethanol is low.

The direct injection of ethanol provides substantially a 13° C. drop in temperature for every ten percent of fuel energy provided by ethanol. An instantaneous octane enhancement of at least 4 octane numbers may be obtained for every 20 percent of the engine's energy coming from the ethanol.

DESCRIPTION OF THE PREFERRED EMBODIMENT

Figure 1:
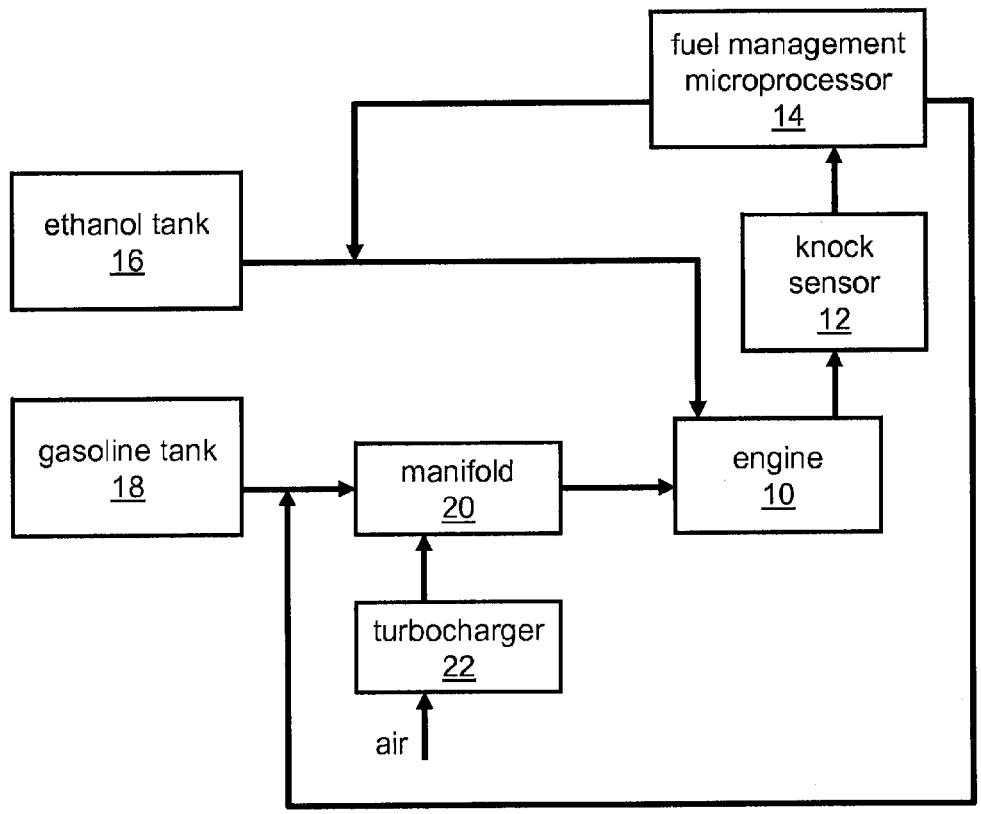
FIG. 1 is a block diagram of one embodiment of the invention disclosed herein.

With reference first to FIG. 1, a spark ignition gasoline engine 10 includes a knock sensor 12 and a fuel management microprocessor system 14. The fuel management microprocessor system 14 controls the direct injection of an antiknock agent such as ethanol from an ethanol tank 16. The fuel management microprocessor system 14 also controls the delivery of gasoline from a gasoline tank 18 into engine manifold 20. A turbocharger 22 is provided to improve the torque and power density of the engine 10. The amount of ethanol injection is dictated either by a predetermined correlation between octane number enhancement and fraction of fuel that is provided by ethanol in an open loop system or by a closed loop control system that uses a signal from the knock sensor 12 as an input to the fuel management microprocessor 14. In both situations, the fuel management processor 14 will minimize the amount of ethanol added to a cylinder while still preventing knock. It is also contemplated that the fuel management microprocessor system 14 could provide a combination of open and closed loop control.

As show in FIG. 1 it is preferred that ethanol be directly injected into the engine 10. Direct injection substantially increases the benefits of ethanol addition and decreases the required amount of ethanol. Recent advances in fuel injector and electronic control technology allows fuel injection directly into a spark ignition engine rather than into the manifold 20. Because ethanol has a high heat of vaporization there will be substantial cooling when it is directly injected into the engine 10. This cooling effect further increases knock resistance by a considerable amount. In the embodiment of FIG. 1 port fuel injection of the gasoline in which the gasoline is injected into the manifold rather than directly injected into the cylinder is preferred because it is advantageous in obtaining good air/fuel mixing and combustion stability that are difficult to obtain with direct injection.

Ethanol has a heat of vaporization of 840 kJ/kg, while the heat of vaporization of gasoline is about 350 kJ/kg. The attractiveness of ethanol increases when compared with gasoline on an energy basis, since the lower heating value of ethanol is 26.9 MJ/kg while for gasoline it is about 44 MJ/kg. Thus, the heat of vaporization per Joule of combustion energy is 0.031 for ethanol and 0.008 for gasoline. That is, for equal amounts of energy the required heat of vaporization of ethanol is about four times higher than that of gasoline. The ratio of the heat of vaporization per unit air required for stoichiometric combustion is about 94 kJ/kg of air for ethanol and 24 kJ/kg of air for gasoline, or a factor of four smaller. Thus, the net effect of cooling the air charge is about four times lower for gasoline than for ethanol (for stoichiometric mixtures wherein the amount of air contains oxygen that is just sufficient to combust all of the fuel).

Figure 2:
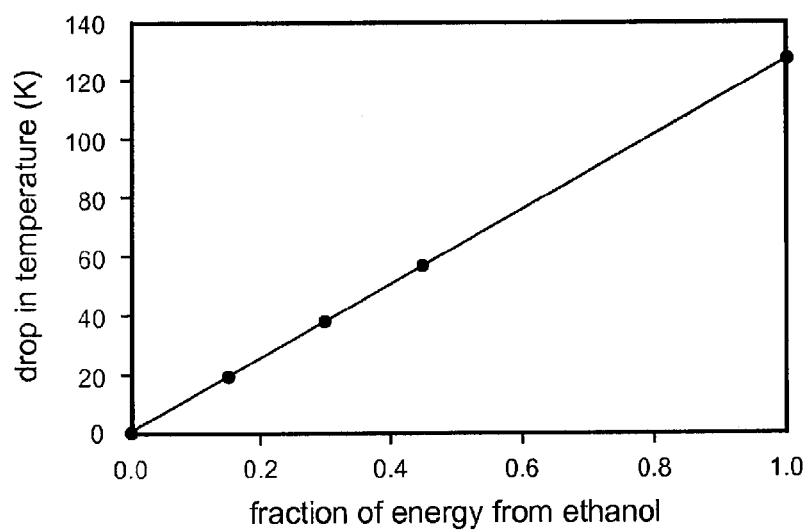
FIG. 2 is a graph of the drop in temperature within a cylinder as a function of the fraction of energy provided by ethanol.

In the case of ethanol direct injection according to one aspect of the invention, the charge is directly cooled. The amount of cooling due to direct injection of ethanol is shown in FIG. 2. It is assumed that the air/fuel mixture is stoichiometric without exhaust gas recirculation (EGR), and that gasoline makes up the rest of the fuel. It is further assumed that only the ethanol contributes to charge cooling. Gasoline is vaporized in the inlet manifold and does not contribute to cylinder charge cooling. The direct ethanol injection provides about 13° C. of cooling for each 10% of the fuel energy provided by ethanol. It is also possible to use direct injection of gasoline as well as direct injection of ethanol. However, under certain conditions there can be combustion stability issues.

The temperature decrement because of the vaporization energy of the ethanol decreases with lean operation and with EGR, as the thermal capacity of the cylinder charge increases. If the engine operates at twice the stoichiometric air/fuel ratio, the numbers indicated in FIG. 2 decrease by about a factor of 2 (the contribution of the ethanol itself and the gasoline is relatively modest). Similarly, for a 20% EGR rate, the cooling effect of the ethanol decreases by about 25%.

The octane enhancement effect can be estimated from the data in FIG. 2. Direct injection of gasoline results in approximately a five octane number decrease in the octane number required by the engine, as discussed by Stokes, et al. Thus the contribution is about five octane numbers per 30K drop in charge temperature. As ethanol can decrease the charge temperature by about 120K, then the decrease in octane number required by the engine due to the drop in temperature, for 100% ethanol, is twenty octane numbers. Thus, when 100% of the fuel is provided by ethanol, the octane number enhancement is approximately thirty-five octane numbers with a twenty octane number enhancement coming from direct injection cooling and a fifteen octane number enhancement coming from the octane number of ethanol. From the above considerations, it can be projected that even if the octane enhancement from direct cooling is significantly lower, a total octane number enhancement of at least 4 octane numbers should be achievable for every 20% of the total fuel energy that is provided by ethanol.

Alternatively the ethanol and gasoline can be mixed together and then port fuel injected using a single injector per cylinder, thereby decreasing the number of injectors that would be used. However, the substantial air charge cooling benefit from ethanol would be lost. The volume of fuel between the mixing point and the port fuel injector should be minimized in order to meet the demanding dynamic octane-enhancement requirements of the engine.

Relatively precise determinations of the actual amount of octane enhancement from given amounts of direct ethanol injection can be obtained from laboratory and vehicle tests in addition to detailed calculations. These correlations can be used by the fuel management microprocessor system 14.

An additional benefit of using ethanol for octane enhancement is the ability to use it in a mixture with water. Such a mixture can eliminate the need for the costly and energy consuming water removal step in producing pure ethanol that must be employed when ethanol is added to gasoline at a refinery. Moreover, the water provides an additional cooling (due to vaporization) that further increases engine knock resistance. In contrast the present use of ethanol as an additive to gasoline at the refinery requires that the water be removed from the ethanol.

Since unlike gasoline, ethanol is not a good lubricant and the ethanol fuel injector can stick and not open, it is desirable to add a lubricant to the ethanol. The lubricant will also denature the ethanol and make it unattractive for human consumption.

Further decreases in the required ethanol for a given amount of octane enhancement can be achieved with stratification (non-uniform deposition) of the ethanol addition. Direct injection can be used to place the ethanol near the walls of the cylinder where the need for knock reduction is greatest. The direct injection may be used in combination with swirl. This stratification of the ethanol in the engine further reduces the amount of ethanol needed to obtain a given amount of octane enhancement. Because only the ethanol is directly injected and because it is stratified both by the injection process and by thermal centrifugation, the ignition stability issues associated with gasoline direct injection (GDI) can be avoided.

It is preferred that ethanol be added to those regions that make up the end-gas and are prone to auto-ignition. These regions are near the walls of the cylinder. Since the end-gas contains on the order of 25% of the fuel, substantial decrements in the required amounts of ethanol can be achieved by stratifying the ethanol.

In the case of the engine 10 having substantial organized motion (such as swirl), the cooling will result in forces that thermally stratify the discharge (centrifugal separation of the regions at different density due to different temperatures).

The effect of ethanol addition is to increase gas density since the temperature is decreased. With swirl the ethanol mixture will automatically move to the zone where the end-gas is, and thus increase the anti-knock effectiveness of the injected ethanol. The swirl motion is not affected much by the compression stroke and thus survives better than tumble-like motion that drives turbulence towards top-dead-center (TDC) and then dissipates. It should be pointed out that relatively modest swirls result in large separating (centrifugal) forces. A 3 m/s swirl motion in a 5 cm radius cylinder generates accelerations of about 200 m/s$^2$, or about 20 g's.

Figure 3:
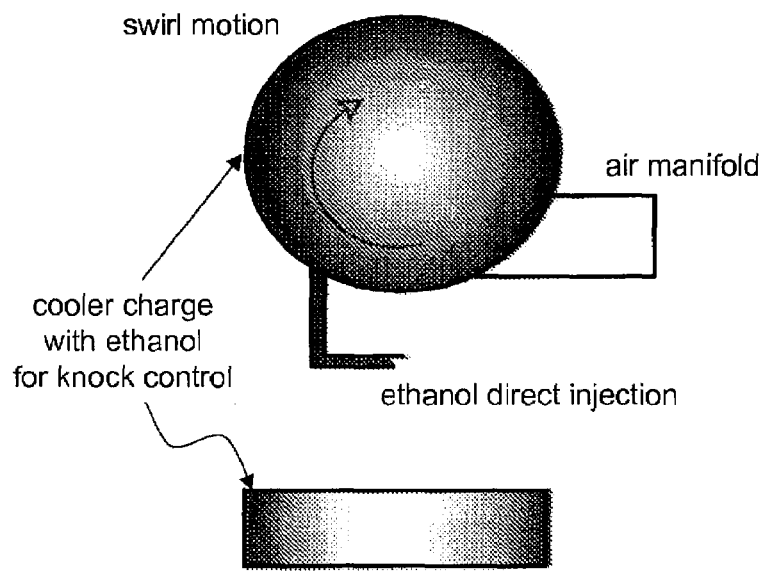
FIG. 3 is a schematic illustration of the stratification of cooler ethanol charge using direct injection and swirl motion for achieving thermal stratification.
Figure 4:
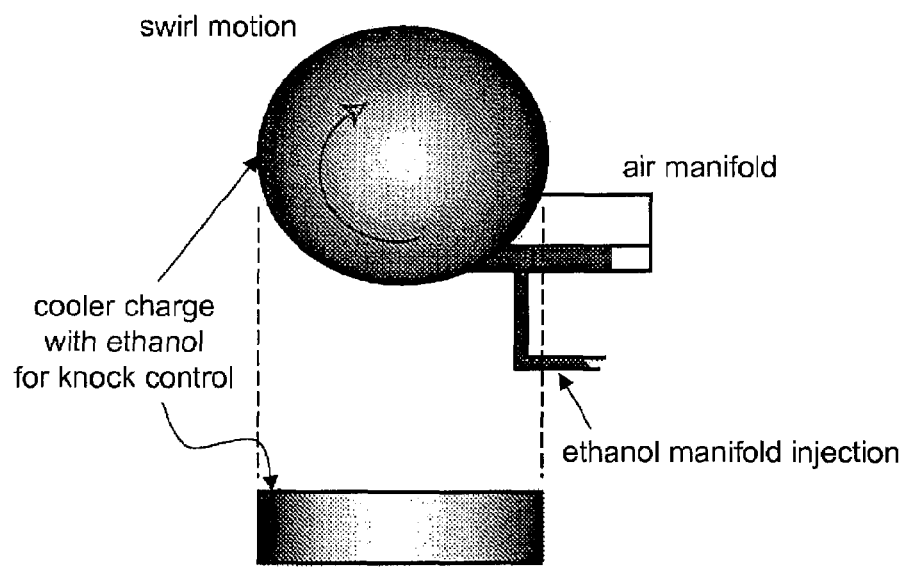
FIG. 4 is a schematic illustration showing ethanol stratified in an inlet manifold.

FIG. 3 illustrates ethanol direct injection and swirl motion for achieving thermal stratification. Ethanol is predominantly on an outside region which is the end-gas region. FIG. 4 illustrates a possible stratification of the ethanol in an inlet manifold with swirl motion and thermal centrifugation maintaining stratification in the cylinder. In this case of port injection of ethanol, however, the advantage of substantial charge cooling may be lost.

With reference again to FIG. 2, the effect of ethanol addition all the way up to 100% ethanol injection is shown. At the point that the engine is 100% direct ethanol injected, there may be issues of engine stability when operating with only stratified ethanol injection that need to be addressed. In the case of stratified operation it may also be advantageous to stratify the injection of gasoline in order to provide a relatively uniform equivalence ratio across the cylinder (and therefore lower concentrations of gasoline in the regions where the ethanol is injected). This situation can be achieved, as indicated in FIG. 4, by placing fuel in the region of the inlet manifold that is void of ethanol.

The ethanol used in the invention can either be contained in a separate tank from the gasoline or may be separated from a gasoline/ethanol mixture stored in one tank.

The instantaneous ethanol injection requirement and total ethanol consumption over a drive cycle can be estimated from information about the drive cycle and the increase in torque (and thus increase in compression ratio, engine power density, and capability for downsizing) that is desired. A plot of the amount of operating time spent at various values of torque and engine speed in FTP and US06 drive cycles can be used. It is necessary to enhance the octane number at each point in the drive cycle where the torque is greater than permitted for knock free operation with gasoline alone. The amount of octane enhancement that is required is determined by the torque level.

A rough illustrative calculation shows that only a small amount of ethanol might be needed over the drive cycle. Assume that it is desired to increase the maximum torque level by a factor of two relative to what is possible without direct injection ethanol octane enhancement. Information about the operating time for the combined FTP and US06 cycles shows that approximately only 10 percent of the time is spent at torque levels above 0.5 maximum torque and less than 1 percent of the time is spent above 0.9 maximum torque. Conservatively assuming that 100% ethanol addition is needed at maximum torque and that the energy fraction of ethanol addition that is required to prevent knock decreases linearly to zero at 50 percent of maximum torque, the energy fraction provided by ethanol is about 30 percent. During a drive cycle about 20 percent of the total fuel energy is consumed at greater than 50 percent of maximum torque since during the 10 percent of the time that the engine is operated in this regime, the amount of fuel consumed is about twice that which is consumed below 50 percent of maximum torque. The amount of ethanol energy consumed during the drive cycle is thus roughly around 6 percent (30 percent×0.2) of the total fuel energy.

In this case then, although 100% ethanol addition was needed at the highest value of torque, only 6% addition was needed averaged over the drive cycle. The ethanol is much more effectively used by varying the level of addition according to the needs of the drive cycle. Because of the lower heat of combustion of ethanol, the required amount of ethanol would be about 9% of the weight of the gasoline fuel or about 9% of the volume (since the densities of ethanol and gasoline are comparable). A separate tank with a capacity of about 1.8 gallons would then be required in automobiles with twenty gallon gasoline tanks. The stored ethanol content would be about 9% of that of gasoline by weight, a number not too different from present-day reformulated gasoline. Stratification of the ethanol addition could reduce this amount by more than a factor of two. An on-line ethanol distillation system might alternatively be employed but would entail elimination or reduction of the increase torque and power available from turbocharging.

Figure 5:
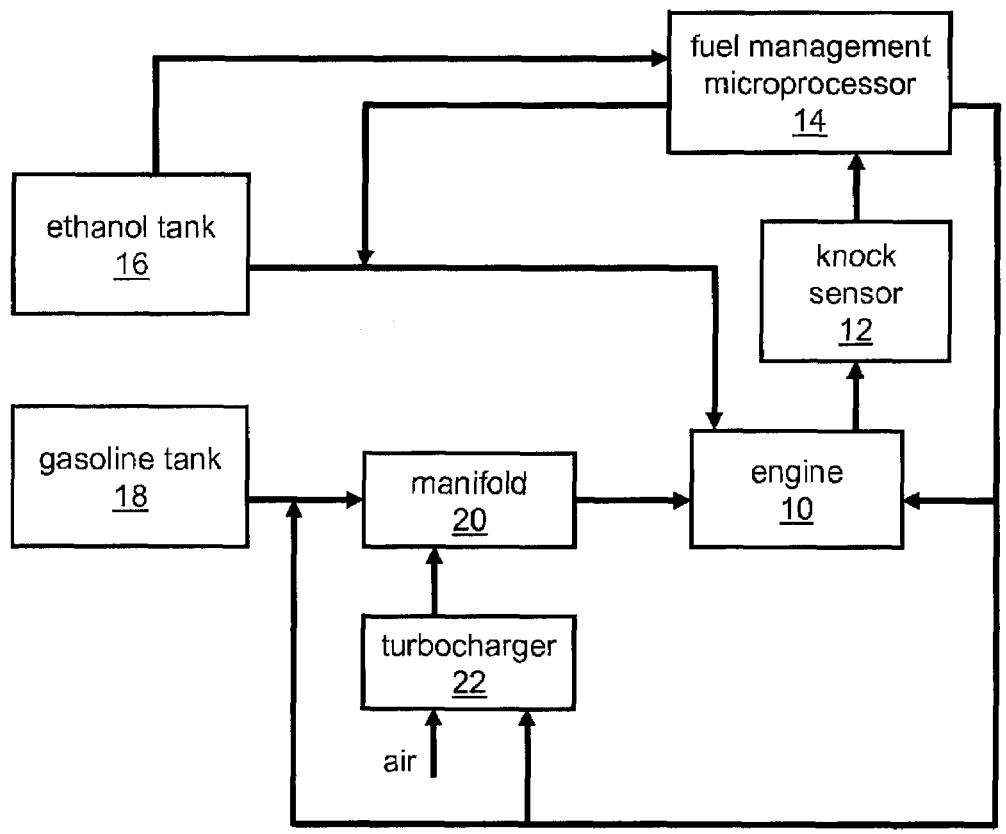
FIG. 5 is a block diagram of an embodiment of the invention in which the fuel management microprocessor is used to control a turbocharger and spark retard based upon the amount of ethanol in a fuel tank.

Because of the relatively small amount of ethanol and present lack of an ethanol fueling infrastructure, it is important that the ethanol vehicle be operable if there is no ethanol on the vehicle. The engine system can be designed such that although the torque and power benefits would be lower when ethanol is not available, the vehicle could still be operable by reducing or eliminating turbocharging capability and/or by increasing spark retard so as to avoid knock. As shown in FIG. 5, the fuel management microprocessor system 14 uses ethanol fuel level in the ethanol tank 16 as an input to control the turbocharger 22 (or supercharger or spark retard, not shown). As an example, with on-demand ethanol octane enhancement, a 4-cylinder engine can produce in the range of 280 horsepower with appropriate turbocharging or supercharging but could also be drivable with an engine power of 140 horsepower without the use of ethanol according to the invention.

The impact of a small amount of ethanol upon fuel efficiency through use in a higher efficiency engine can greatly increase the energy value of the ethanol. For example, gasoline consumption could be reduced by 20% due to higher efficiency engine operation from use of a high compression ratio, strongly turbocharged operation and substantial engine downsizing. The energy value of the ethanol, including its value in direct replacement of gasoline (5% of the energy of the gasoline), is thus roughly equal to 25% of the gasoline that would have been used in a less efficient engine without any ethanol. The 5% gasoline equivalent energy value of ethanol has thus been leveraged up to a 25% gasoline equivalent value. Thus, ethanol can cost roughly up to five times that of gasoline on an energy basis and still be economically attractive. The use of ethanol as disclosed herein can be a much greater value use than in other ethanol applications.

Although the above discussion has featured ethanol as an exemplary anti-knock agent, the same approach can be applied to other high octane fuel and fuel additives with high vaporization energies such as methanol (with higher vaporization energy per unit fuel), and other anti-knock agents such as tertiary butyl alcohol, or ethers such as methyl tertiary butyl ether (MTBE), ethyl tertiary butyl ether (ETBE), or tertiary amyl methyl ether (TAME).

It is recognized that modifications and variations of the invention disclosed herein will be apparent to those of ordinary skill in the art and it is intended that all such modifications and variations be included within the scope of the appended claims.

What is claimed is:

1. Fuel management system for operation of a spark ignition gasoline engine comprising:
    a gasoline engine;
    a source of an anti-knock agent;
    an injector for direct injection of the anti-knock agent into a cylinder of the engine; and
    a fuel management control system for controlling injection of the anti-knock agent into the cylinder to control knock.

2. The system of claim 1 wherein the injectors deposit the anti-knock agent to provide non-uniform deposition within a cylinder.

3. The system of claim 2 wherein the anti-knock agent is deposited near the walls of the cylinder.

4. The system of claim 2 wherein the non-uniform deposition is obtained through direct injection and charge swirl.

5. The system of claim 1 wherein the anti-knock agent is selected from the group consisting of ethanol, methanol, tertiary butyl alcohol, MTBE, ETBE and TAME.

6. The system of claim 1 wherein the fuel management system includes a microprocessor that operates in an open loop fashion on a predetermined correlation between required octane number enhancement and fraction of fuel provided by the anti-knock agent.

7. The system of claim 1 wherein the gasoline engine includes a knock sensor providing a feedback signal to a fuel management microprocessor to minimize the amount of the anti-knock agent added to prevent knock in a closed loop fashion.

8. The system of claim 1 wherein the anti-knock agent is ethanol.

9. The system of claim 8 wherein the ethanol is mixed with water.

10. The system of claim 8 wherein the ethanol is mixed with a lubricant.

11. The system of claim 1 wherein the engine has substantial organized motion such as swirl.

12. The system of claim 1 wherein the system includes a measure of the amount of anti-knock agent in the source to control turbocharging, supercharging or spark retard when the amount of anti-knock agent is low.

13. The system of claim 1 wherein the anti-knock agent is added only during portions of a drive cycle requiring knock resistance.

14. The system of claim 1 wherein gasoline is port injected into the engine.

15. The system of claim 1 wherein the gasoline is directly injected into the cylinder.

16. The system of claim 8 wherein the direct injection of ethanol provides substantially a 13° C. drop in temperature for every 10% of fuel energy provided by the ethanol.

17. The system of claim 1 wherein the fuel management system substantially minimizes the amount of anti-knock agent used over a drive cycle.

18. The system of claim 8 wherein an octane enhancement of at least 4 octane numbers is obtained when 20% of the fuel energy in a cylinder comes from ethanol.

19. The system of claim 1 wherein turbocharging or supercharging are reduced or eliminated and/or spark retard is increased when the anti-knock agent is not available.

20. The system of claim 8 wherein ethanol is injected proximate to a cylinder wall and swirl creates a ring of ethanol.

21. The system of claim 8 wherein the engine is operated with substantially a stoichiometric air/fuel ratio.

22. The system of claim 8 wherein the ethanol is added only during portions of the drive cycle requiring knock resistance and its use is minimized during those times.

23. Fuel management system for operation of a spark ignition gasoline engine comprising:
    a gasoline engine;
    a source of ethanol;
    an injector for direct injection of the ethanol into a cylinder of the engine; and
    a fuel management control system for controlling injection of the ethanol into the cylinder when engine torque is above a selected fraction of maximum torque.

24. The system of claim 23 wherein the fraction of total fuel provided by the directly injected ethanol increases with increasing torque.

25. The system of claim 23 wherein the gasoline engine includes a knock sensor providing a feedback signal to a fuel management microprocessor to minimize the amount of the ethanol added to prevent knock in a closed loop fashion.

* * * * *